(12) United States Patent
Boesen et al.

(10) Patent No.: US 6,784,873 B1
(45) Date of Patent: Aug. 31, 2004

(54) METHOD AND MEDIUM FOR COMPUTER READABLE KEYBOARD DISPLAY INCAPABLE OF USER TERMINATION

(76) Inventors: Peter V. Boesen, 4026 Beaver Ave., Des Moines, IA (US) 50310; Thomas J. Mann, 330 N. 93$^{rd}$ St., Omaha, NE (US) 68114

(*) Notice: Subject to any disclaimer, the term of this patent is extended or adjusted under 35 U.S.C. 154(b) by 70 days.

(21) Appl. No.: 09/632,922

(22) Filed: Aug. 4, 2000

(51) Int. Cl.$^7$ ............................................... G09G 5/00
(52) U.S. Cl. ...................... 345/173; 345/174; 345/175; 345/168
(58) Field of Search ................................ 345/173, 175, 345/174, 168

(56) References Cited

U.S. PATENT DOCUMENTS

| | | | |
|---|---|---|---|
| 5,736,973 A | * 4/1998 | Godfrey et al. | 345/102 |
| 6,081,263 A | 6/2000 | LeCall et al. | 345/327 |
| 6,094,197 A | * 7/2000 | Buxton et al. | 345/358 |

OTHER PUBLICATIONS

Alan Freeman, The Computer Desktop Encyclopedia, 1999, The Computer Language Company Inc., second edition, pp. 99, 254, 678, 976.*

Article entitled "Wireless Future Sizzles," by Keith Darce, The Times Picayne, Sep. 26, 1999.

Article entitled "Tiny computers come in handy, doctors find" by Thomas R. O'Connell, The Des Moines Register, pp. 1B, 4B.

* cited by examiner

Primary Examiner—Matthew C. Bella
Assistant Examiner—Tam Tran
(74) Attorney, Agent, or Firm—McKee, Voorhees & Sease, P.L.C.

(57) ABSTRACT

A method and medium for a computer readable input area. The input area is created by a computer program on a display capable of receiving touch-screen input. The computer on which the input area in used is at least a 32-bit system. The input area may contain a keyboard which is an image map. External programming may selectively access the input area through a dynamic link library. The input area has no task bar and may not be minimized, maximized, or deleted. Therefore, the input area becomes an integral component and provides the user with a constant and reliable method of inputting information into the computer program.

10 Claims, 2 Drawing Sheets

METHOD AND MEDIUM FOR COMPUTER READABLE KEYBOARD DISPLAY INCAPABLE OF USER TERMINATION

BACKGROUND OF THE INVENTION

1. Field of the Invention

The present invention relates generally to a method and medium for inputting data, and more particularly, to a keyboard of constant size and shape present on the screen of a touch-screen style computer whenever user input may be desired. The keyboard display may be used by any number of computer software programs, including any known operating system in which a touch-sensitive computer display may be incorporated. Additionally, the present invention may be used in conjunction with any individual computer, network and/or Internet based system.

2. Problem in the Art

Computers with touch-screen displays, allowing a user to simply press on a desired location to obtain a desired input, have been around for some time. For example, a pen-based computer, such as the Fujitsu Model Point 1600, allows a user to press on the screen using the attached pen or other styli, and thereby provide user input. The use of such a pen-based computer allows a user to enter all necessary data without the need for an external keyboard, mouse or other input device. The use of an on-screen keyboard in such a computer allows a user to input data without the need for additional handwriting recognition software. Handwriting recognition software, while constantly improving, is often inaccurate and cumbersome. Further, such handwriting recognition software is often processor intensive.

Currently, on-screen keyboards allow a user to maximize, minimize, or simply remove the keyboard on the display. Further, the shape and size of the keyboard may be altered. Often, such alterations or terminations are accidental and returning a keyboard to a useable size and shape wastes valuable time. In a medical setting, for example, it is highly undesirable to have a care provider attempting to recover from an accidental keyboard alteration when the care provider should be attending to and recording information on patients. It is therefore desirable to provide an on-screen keyboard which is incapable of alteration or termination by a user.

More and more applications are being developed for pen-based or touch-screen based computers. These applications will typically require a user to input data at a specific location on the screen. An on-screen keyboard may be necessary to provide the desired input. However, current on-screen keyboards may be moved by the user and therefore placed in undesirable locations which may block necessary text input fields or instructions. Further, current on-screen keyboard include a task bar having minimizing and maximizing buttons which allow a user to enlarge or reduce the window in which the keyboard appears. Often, such keyboards also include a close button which allows the user to terminate the keyboard. Upon pressing these buttons, many computer novices have difficulty launching another instance of the keyboard or recovering the keyboard to a usable state. It is therefore desirable to have an on-screen keyboard which is capable of permanent placement on a computer display.

Computer programs may require input only randomly. Many ask for user input and then present the results. As it would clearly hamper the presentation of results, data or other information to have an on-screen keyboard present at all times, it is desirable to provide an on-screen keyboard which may be selectively called up as a subroutine or subprogram by a variety of programming.

There is therefore a need to have an on-screen keyboard which solves these and other problems in the art.

FEATURES OF THE INVENTION

A general feature of the present invention is the provision of an input area which overcomes the problems found in the prior art.

A further feature of the present invention is the provision of an input area which may be used in conjunction with touch-sensitive displays.

Another feature of the present invention is the provision of an input area which is immutable.

A further feature of the present invention is the provision of an input area which may not be moved.

A still further feature of the present invention is the provision of an input area which allows a user to input data without the need for handwriting recognition software.

An additional feature of the present invention is the provision of an input area which may not be maximized.

Another feature of the present invention is the provision of an input area which may not be minimized.

A still further feature of the present invention is the provision of an input area which may not be removed by the user.

A further feature of the present inventions the provision of an input area which contains a keyboard.

Another feature of the present invention i the provision of an input area which may be selectively used by a computer program.

A still further feature of the present invention is the provision of an input area which provides an easy to use and reliable method of inputting information into a computer system regardless of the level of computer skill possessed by the user.

These, as well as other features and advantages of the present invention will become apparent from the following specification and claims.

SUMMARY OF THE INVENTION

The present invention generally comprises an immutable keyboard display. In a preferred embodiment, the present invention includes a software application that provides a keyboard display which may not be minimized, maximized, closed, or deleted. Further, the keyboard display allows a user to input information as desired via a touch-screen based or pen based computer.

DETAILED DESCRIPTION OF THE EMBODIMENT

The present invention will be described as it applies to its preferred embodiment. It is not intended that the present invention be limited to the described embodiment. It is intended that the invention cover all modifications and alternatives which may be included within the spirit and scope of the invention.

Figure 1:
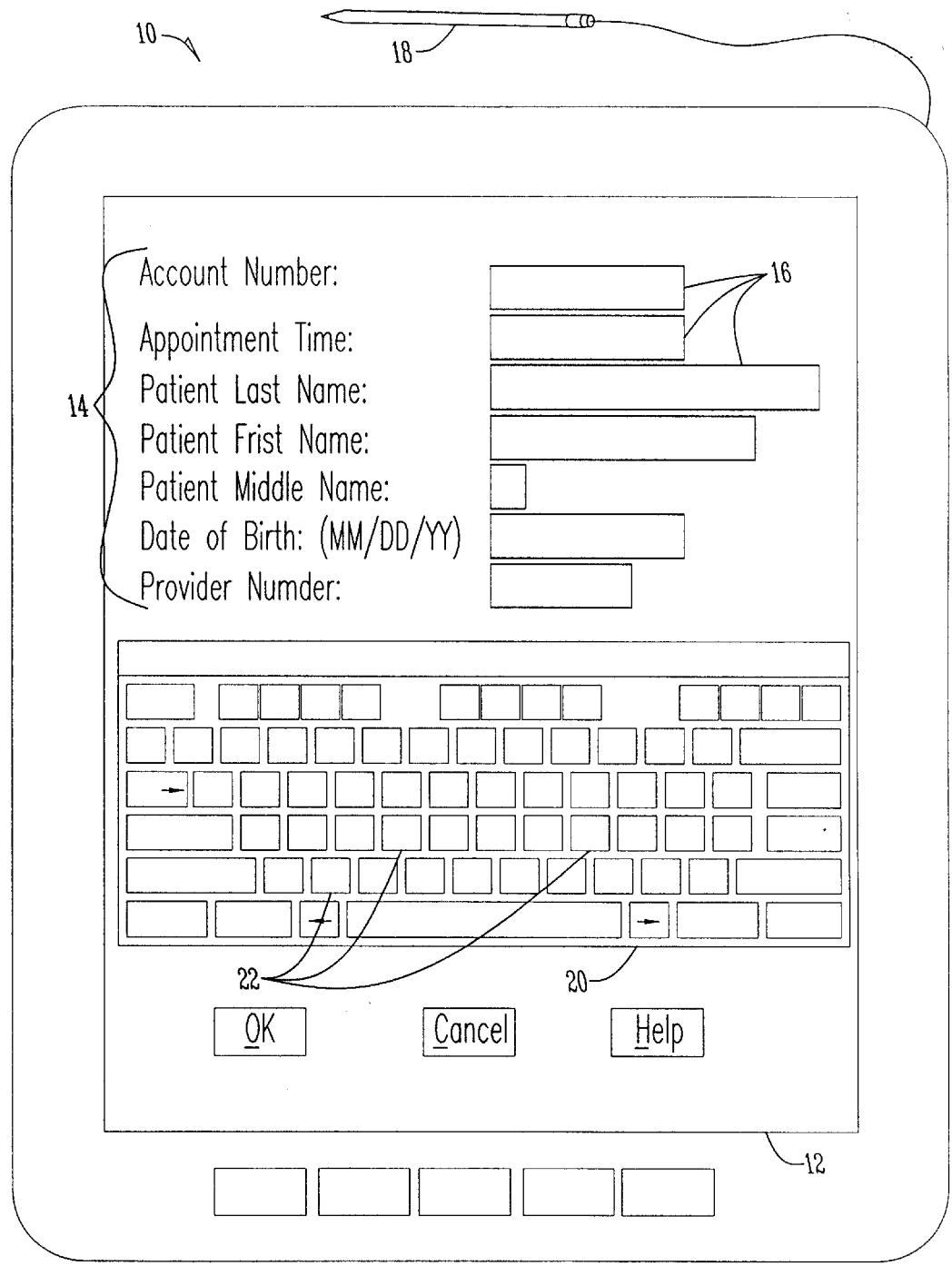
FIG. 1 is a pictorial representation of a display of a pen-based computer incorporating the keyboard display of the present invention.

As shown in FIG. 1, a pen-based computer 10, such as the Fujitsu Model Point 1600, includes a touch-sensitive display 12. On the display 12 is shown the user interface for a software application 14 which may be running from or accessed by the computer 10. It is to be understood that the computer 10 could be a stand-alone computer or a part of any network or Internet based system. However, the computer 10 preferably provides a 32 bit environment. Computer 10 may access any type of software application through any number of known drives or via a network or web server. Once accessed, the user will see the application as it appears on the display 12 of the computer 10. The application may ask for user input at various locations through the use of text boxes 16 or other fields. The user may provide the desired input by holding the pen 18 or any other known input device which may include the user's finger, and pressing on the display 12 of the computer 10 so as to strike a desired key 22 of the keyboard 20.

The keyboard 20 is preferably an image map or active map incorporated at a set location on the display 12. The keyboard 20 may not be moved, maximized, or minimized. Therefore, the keyboard 20 provides the user with a constant input area to which the user may become accustomed and becomes an integral component.

Figure 2:
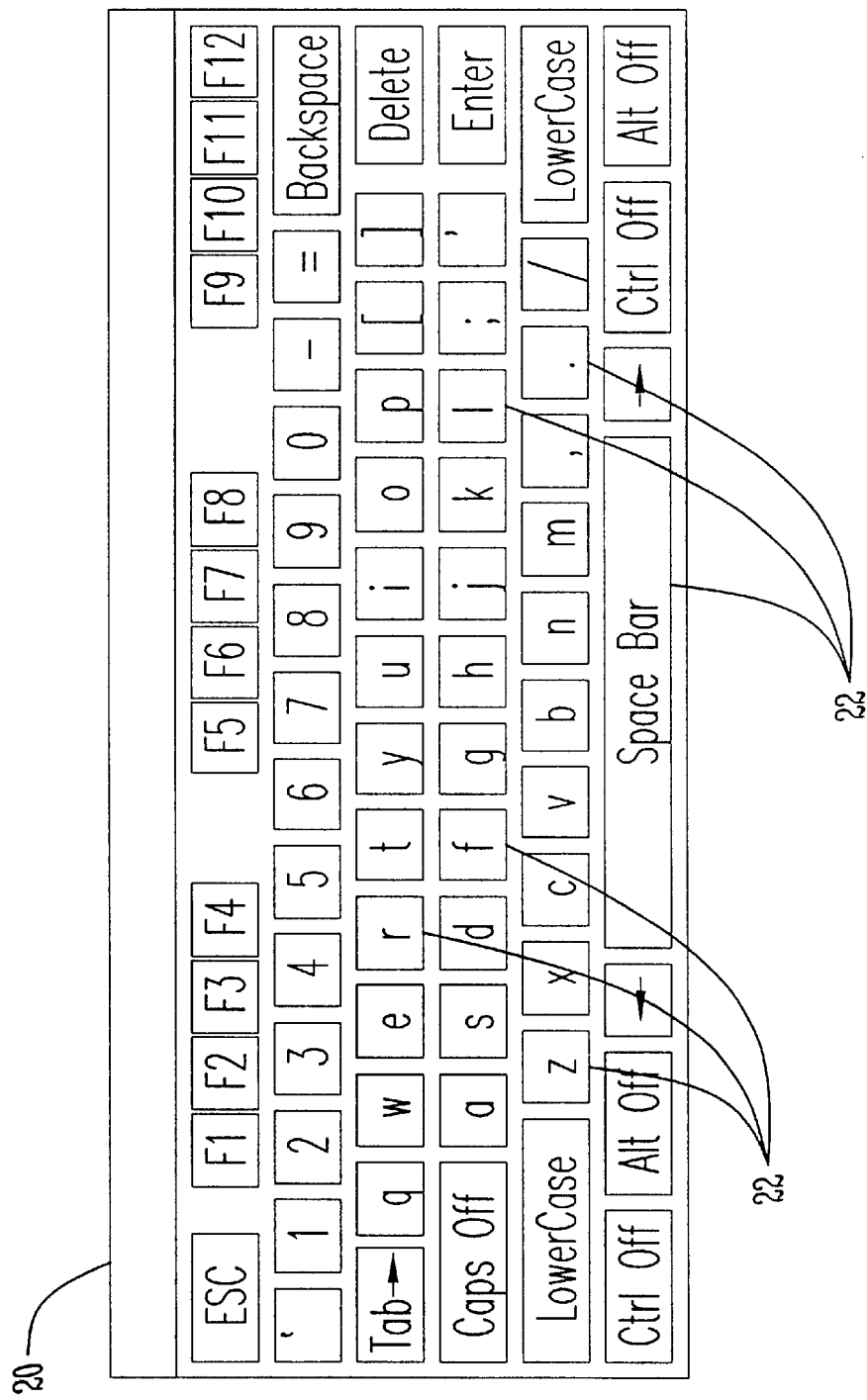
FIG. 2 is a close-up view of the keyboard display of the present invention.

The keyboard 20, as shown in FIG. 2, contains a plurality of keys 22. The keys 22 may include all those currently found on any standard typewriter or computer keyboard, or may be application-specific. For instance, if the software in which user input is desired is primarily financial software, the keyboard 20 may include only numbers. Further, if the software requires the user to input names or words, the keyboard 20 may include one key 22 for every letter of the alphabet and any necessary punctuation or function keys. Further, the keys 22 may be programmed to represent any symbol or accentuated letter to allow the keyboard to be used in applications in which input may be required in various languages.

The keyboard 20 is preferably the result of a software application written in Visual Basic or C++, though various software programming languages may be used. The keyboard has all task bars removed and may not be minimized, maximized, deleted, closed or resized and is therefore immutable. Preferably, the keyboard application is a subroutine or subprogram which is made available for use by external software applications. The keyboard application is preferably part of the operating system running on the computer 10. Incorporating the keyboard application into the computer 10 allows the keyboard application to be available to any external software application capable of running on the computer 10. The keyboard application may include a dynamic link library (dll) application. The dll application allows the external software to selectively use the keyboard and either have the keyboard in or out. This allows the software to use the entirety of the screen when necessary for displaying information or results.

An example of the keyboard application programming as it would appear in Visual Basic is:
Option Explicit
Public Sub Shift_Down( )
cmdLeftShift.Caption="LowerCase"
cmdRightShift.Caption="LowerCase"
cmdLeftShift.Tag="OFF"
cmdRightShift.Tag="OFF"
Caps_OFF
Command1(26).Caption="0"
Command1(27).Caption="1"
Command1(28).Caption="2"
Command1(29).Caption="3"
Command1(30).Caption="4"
Command1(31).Caption="5"
Command1(32).Caption="6"
Command1(33).Visible=False
Command1(44).Visible=True
Command1(34).Caption="8"
Command1(35).Caption="9"
Command1(36).Caption=","
Command1(37).Caption="."
Command1(38).Caption="/"
Command1(39).Caption=";"
Command1(40).Caption="'"
Command1(41).Caption="["
Command1(42).Caption="]"
Command1(43).Caption="\"
Command1(48).Caption="F1"
Command1(49).Caption="F2"
Command1(50).Caption="F3"
Command1(51).Caption="F4"
Command1(52).Caption="F5"
Command1(53).Caption="F6"
Command1(54).Caption="F7"
Command1(55).Caption="F8"
Command1(56).Caption="F9"
Command1(57).Caption="F10"
Command1(58).Caption="F11"
Command1(59).Caption="F12"
Command1(46).Caption="-"
Command1(47).Caption="="
Command1(45).Caption="'"
Command1(0).Caption="a"
Command1(1).Tag="b"
Command1(2).Tag="c"
Command1(3).Tag="d"
Command1(4).Tag="e"
Command1(5).Tag="f"
Command1(6).Tag="g"
Command1(7).Tag="h"
Command1(8).Tag="i"
Command1(9).Tag="j"
Command1(10).Tag="k"
Command1(11).Tag="l"
Command1(12).Tag="m"
Command1(13).Tag="n"
Command1(14).Tag="o"
Command1(15).Tag="p"
Command1(16).Tag="q"
Command1(17).Tag="r"
Command1(18).Tag="s"
Command1(19).Tag="t"
Command1(20).Tag="u"
Command1(21).Tag="v"
Command1(22).Tag="w"
Command1(23).Tag="x"
Command1(24).Tag="y"
Command1(25).Tag="z"
Command1(26).Tag="0"
Command1(27).Tag="1"
Command1(28).Tag="2"
Command1(29).Tag="3"
Command1(30).Tag="4"
Command1(31).Tag="5"
Command1(32).Tag="6"

Command1(44).Tag="7"
Command1(34).Tag="8"
Command1(35).Tag="9"
Command1(36).Tag ","
Command1(37).Tag="."
Command1(38).Tag="/"
Command1(39).Tag=";"
Command1(40).Tag="'"
Command1(41).Tag="["
Command1(42).Tag="]"
Command1(43).Tag="\"
Command1(48).Tag="{F1}"
Command1(49).Tag="{F2}"
Command1(50).Tag="{F3}"
Command1(51).Tag="{F4}"
Command1(52).Tag="{F5 }"
Command1(53).Tag="{F6}"
Command1(54).Tag="{F7}"
Command1(55).Tag="{F8}"
Command1(56).Tag="{F9}"
Command1(57).Tag="{F10}"
Command1(54).Tag="{F11}"
Command1(58).Tag="{F12}"
Command1(46).Tag="–"
Command1(47).Tag="="
Command1(45).Tag=""
cmdTab.Caption="Tab>"
End Sub
Public Sub Shift_Up( )
cmdLeftShift.Caption="UpperCase"
cmdRightShift.Caption="UpperCase"
cmdLeftShift.Tag="ON"
cmdRightShift.Tag="ON"
Caps_On
Command1(26).Caption=")"
Command1(27).Caption="!"
Command1(28).Caption="@"
Command1(29).Caption="#"
Command1(30).Caption="$"
Command1(31).Caption="%"
Command1(32).Caption="^"
Command1(33).Visible=True
Command1(44).Visible=False
Command1(34).Caption="*"
Command1(35).Caption="("
Command1(36).Caption="<"
Command1(37).Caption=">"
Command1(38).Caption="?"
Command1(39).Caption=":"
Command1(40).Caption="""
Command1(41).Caption="{"
Command1(42).Caption="}"
Command1(43).Caption="|"
Command1(48).Caption="F13"
Command1(49).Caption="F14"
Command1(50).Caption="F15"
Command1(51).Caption="F16"
Command1(52).Caption="F17"
Command1(53).Caption="F18"
Command1(54).Caption="F19"
Command1(55).Caption="F20"
Command1(56).Caption="F21"
Command1(57).Caption="F22"
Command1(58).Caption="F23"
Command1(59).Caption="F24"
Command1(46).Caption="_"
Command1(47).Caption="+"
Command1(45).Caption="~"
Command1(0).Tag="+A"
Command1(1).Tag="B"
Command1(2).Tag="C"
Command1(3).Tag="D"
Command1(4).Tag="E"
Command1(5).Tag="F"
Command1(6).Tag="G"
Command1(7).Tag="H"
Command1(8).Tag="I"
Command1(9).Tag="J"
Command1(10).Tag="K"
Command1(11).Tag="L"
Command1(12).Tag="M"
Command1(13).Tag="N"
Command1(14).Tag="O"
Command1(15).Tag="P"
Command1(16).Tag="Q"
Command1(17).Tag="R"
Command1(18).Tag="S"
Command1(19).Tag="T"
Command1(20).Tag="U"
Command1(21).Tag="V"
Command1(22).Tag="W"
Command1(23).Tag="X"
Command1(24).Tag="Y"
Command1(25).Tag="Z"
Command1(26).Tag="{)}"
Command1(27).Tag="!"
Command1(28).Tag="@"
Command1(29).Tag="#"
Command1(30).Tag="$"
Command1(31).Tag="{%}"
Command1(32).Tag="{^}"
Command1(44).Tag="7"
Command1(34).Tag="*"
Command1(35).Tag="{(}"
Command1(36).Tag="<"
Command1(37).Tag=">"
Command1(38).Tag="!"
Command1(39).Tag=":"
Command1(40).Tag="""
Command1(41).Tag="{{}"
Command1(42).Tag="{}}"
Command1(43).Tag="|"
Command1(48).Tag="{F13}"
Command1(49).Tag="{F14}"
Command1(50).Tag="{F15}"
Command1(51).Tag="{F16}"
Command1(52).Tag="(F17)"
Command1(53).Tag="{F18}"
Command1(54).Tag="{F19}"
Command1(55).Tag="{F20}"
Command1(56).Tag="{F21}"
Command1(57).Tag="{F22}"
Command1(58).Tag="{F23}"
Command1(59).Tag="{F24}"
Command1(46).Tag="_"
Command1(47).Tag="{+}"
Command1(45).Tag="{~}"
cmdTab.Caption="Tab>"
End Sub
Public Sub Caps_On( )
Command1(0).Caption="A"
Command1(1).Caption="B"
Command1(2).Caption="C"
Command1(3).Caption="D"

```
Command1(4).Caption="E"
Command1(5).Caption="F"
Command1(6).Caption="G"
Command1(7).Caption="H"
Command1(8).Caption="I"
Command1(9).Caption="J"
Command1(10).Caption="K"
Command1(11).Caption="L"
Command1(12).Caption="M"
Command1(13).Caption="N"
Command1(14).Caption="O"
Command1(15).Caption="P"
Command1(16).Caption="Q"
Command1(17).Caption="R"
Command1(18).Caption="S"
Command1(19).Caption="T"
Command1(20).Caption="U"
Command1(21).Caption="V"
Command1(22).Caption="W"
Command1(23).Caption="X"
Command1(24).Caption="Y"
Command1(25).Caption="Z"
End Sub
Public Sub Caps_OFF( )
Command1(0).Caption="a"
Command1(1).Caption="b"
Command1(2).Caption="c"
Command1(3).Caption="d"
Command1(4).Caption="e"
Command1(5).Caption="f"
Command1(6).Caption="g"
Command1(7).Caption="h"
Command1(8).Caption="i"
Command1(9).Caption="j"
Command1(10).Caption="k"
Command1(11).Caption="l"
Command1(12).Caption="m"
Command1(13).Caption="n"
Command1(14).Caption="o"
Command1(15).Caption="p"
Command1(16).Caption="q"
Command1(17).Caption="r"
Command1(18).Caption="s"
Command1(19).Caption="t"
Command1(20).Caption="u"
Command1(21).Caption="v"
Command1(22).Caption="w"
Command1(23).Caption="x"
Command1(24).Caption="y"
Command1(25).Caption="z"
End Sub
Public Sub Set_Caps_Lock( )
  If cmdCapsLock.Tag="OFF" Then
    cmdCapsLock.Caption="Caps On"
    cmdCapsLock.Tag="ON"
    Caps_On
  Else
    cmdCapsLock.Caption="Caps Off"
    cmdCapsLock.Tag="OFF"
    Caps_OFF
  End If
  strKeys=""
  strKeys=strKeys & "{CAPSLOCK}"
  SendVKeys (strKeys)
End Sub
Public Sub Key_Layoutl( )
  Dim intTemp, intRightBorder As Integer
  Dim lngpcnt As Double
  Dim dblFontSize As Double
  Dim lngFormWidth As Long
  Dim intRow1Top, intRow2Top, intRow3Top, intRow4Top, intRow5Top, intRow6Top, intRow7Top As Integer
  Dim intFontSize, intHeight, intLetterWidth, intFunctionWidth As Integer
  lngFormWidth=frmKeys.Width
  If frmKeys.BorderStyle>0 Then
    lngPcnt=lngFormWidth/7135
  Else
    lngPcnt=lngFormWidth/6975
  End If
  'lngPcnt=lngFormWidth/6975
  'pKB.Height=2790*lngPcnt
  'pKB.Height=(3390*lngPcnt)
  intHeight=330*lngPcnt
  intLetterWidth=350*lngPcnt
  intFunctionWidth=470*lngpcnt
  intTemp=intFunctionWidth/24
  intFunctionWidth=(intTemp+1)*24
  intFontSize=9*lngPcnt
  dblFontSize=8*lngPcnt
  intRow1Top=60*lngPcnt
  intRow2Top=540 lngpcnt
  intRow3Top=960*lngPcnt
  intRow4Top=1380*lngPcnt
  intRow5Top=1860*lngpcnt
  intRow6Top=2340*lngPcnt
  intRow7Top=2820*lngPcnt
  'Set the form height to porportion with form width
  If frmKeys.BorderStyle>0 Then
    frmKeys.Height=intRow6Top+intHeight+465
  Else
    frmKeys.Height=intRow6Top+intHeight+60
  End If
  'Row 1
  'Escape Key
  cmdEscape.Font.Size=dblFontSize
  cmdEscape.Top=intRow1Top
  cmdEscape.Left=60*lngpcnt
  cmdEscape.Width=670*lngPcnt
  cmdEscape.Height=intHeight
  'F1 Key
  Command1(48).Font.Size=intFontSize
  Command1(48).Top=intRow1Top
  Command1(48).Left=805*lngpcnt
  Command1(48).Width=intFunctionWidth
  Command1(48).Height=intHeight
  'F2 Key
  Command1(49).Font.Size=intFontSize
  Command1(49).Top=intRow1Top
  Command1(49).Left=Command1(48).Left+Command1(48).Width '1285*lngpcnt
  Command1(49).Width=intFunctionWidth
  Command1(49).Height=intHeight
  'F3 Key
```

Command1(50).Font.Size=intFontSize
Command1(50).Top=intRow1Top
Command1(50).Left=Command1(49).Left+Command1(49).Width '1765*lngPcnt
Command1(50).Width=intFunctionWidth
Command1(50).Height=intHeight
'F4 Key
Command1(51).Font.Size=intFontSize
Command1(51).Top=intRow1Top
Command1(51).Left=Command1(50).Left+Command1(50).Width '2245*lngpcnt
Command1(51).Width=intFunctionWidth
Command1(51).Height=intHeight
'F5 Key
Command1(52).Font.Size=intFontSize
Command1(52).Top=intRow1Top
Command1(52).Left=2905*lngpcnt
Command1(52).Width=intFunctionWidth
Command1(52).Height=intHeight
'F6 Key
Command1(53).Font.Size=intFontSize
Command1(53).Top=intRow1Top
Command1(53).Left=Command1(52).Left+Command1(52).Width '3385*lngPcnt
Command1(53).Width=intFunctionWidth
Command1(53).Height=intHeight
'F7 Key
Command1(54).Font.Size=intFontSize
Command1(54).Top=intRow1Top
Command1(54).Left=Command1(53).Left+Command1(53).Width '3865*lngPcnt
Command1(54).Width=intFunctionWidth
Command1(54).Height=intHeight
'F8 Key
Command1(55).Font.Size=intFontSize
Command1(55).Top=intRow1Top
Command1(55).Left=Command1(54).Left+Command1(54).Width '4345*lngPcnt
Command1(55).Width=intFunctionWidth
Command1(55).Height=intHeight
'F9 Key
Command1(56).Font.Size=intFontSize
Command1(56).Top=intRow1Top
Command1(56).Left=5005*lngPcnt
Command1(56).Width=intFunctionWidth
Command1(56).Height=intHeight
'F10 Key
Command1(57).Font.Size=dblFontSize
Command1(57).Top=intRow1Top
Command1(57).Left=Command1(56).Left+Command1(56).Width '5485*lngPcnt
Command1(57).Width=intFunctionWidth
Command1(57).Height=intHeight
'F11 Key
Command1(58).Font.Size=dblFontSize
Command1(58).Top intRow1Top
Command1(58).Left=Command1(57).Left+Command1(57).Width '5965*lngpcnt
Command1(58).Width=intFunctionWidth
Command1(58).Height=intHeight
'F12 Key
Command1(59).Font.Size=dblFontSize
Command1(59).Top=intRow1Top
Command1(59).Left=Command1(58).Left+Command1(58).Width '6445*lngpcnt
Command1(59).Width=intFunctionWidth
Command1(59).Height=intHeight
intRightBorder=Command1(59).Left+Command1(59).Width
'Row 2
"Key
Command1(45).Font.Size=intFontSize
Command1(45).Top=intRow2Top
Command1(45).Left=60*lngpcnt
Command1(45).Width=intLetterWidth
Command1(45).Height=intHeight
'1 Key
Command1(27).Font.Size=intFontSize
Command1(27).Top=intRow2Top  Command1(27).Left=480*lngPcnt
Command1(27).Width=intLetterWidth
Command1(27).Height=intHeight
'2 Key
Command1(28).Font.Size=intFontSize
Command1(28).Top=intRow2Top
Command1(28).Left=900*lngPcnt
Command1(28).Width=intLetterWidth
Command1(28).Height=intHeight
'3 Key
Command1(29).Font.Size=intFontSize
Command1(29).Top=intRow2Top
Command1(29).Left=1320*lngPcnt
Command1(29).Width=intLetterWidth
Command1(29).Height=intHeight
'4 Key
Command1(30).Font.Size=intFontSize
Command1(30).Top=intRow2Top
Command1(30).Left=1740*lngpcnt
Command1(30).Width=intLetterWidth
Command1(30).Height=intHeight
'5 Key
Command1(31).Font.Size=intFontSize
Command1(31).Top=intRow2Top
Command1(31).Left=2160*lngPcnt
Command1(31).Width=intLetterWidth
Command1(31).Height=intHeight
'6 Key
Command1(32).Font.Size=intFontSize
Command1(32).Top=intRow2Top  Command1(32).Left=2580*lngPcnt
Command1(32).Width=intLetterWidth
Command1(32).Height=intHeight
'& Key
Command1(33).Font.Size=intFontSize
Command1(33).Top=intRow2Top Command1(33).Left=3000*lngPcnt
Command1(33).Width=intLetterWidth
Command1(33).Height=intHeight
'7 Key
Command1(44).Font.Size=intFontSize
Command1(44).Top=intRow2Top
Command1(44).Left=3000*lngPcnt
Command1(44).Width=intLetterWidth
Command1(44).Height=intHeight
'8 Key
Command1(34).Font.Size=intFontSize
Command1(34).Top=intRow2Top
Command1(34).Left=3420*lngpcnt
Command1(34).Width=intLetterWidth
Command1(34).Height=intHeight
'9 Key
Command1(35).Font.Size=intFontSize
Command1(35).Top=intRow2Top
Command1(35).Left=3840*lngPcnt
Command1(35).Width=intLetterWidth
Command1(35).Height=intHeight
0 Key
Command1(26).Font.Size=intFontSize
Command1(26).Top=intRow2Top
Command1(26).Left=4260*lngpcnt
Command1(26).Width=intLetterWidth
Command1(26).Height=intHeight
'- Key
Command1(46).Font.Size=intFontSize
Command1(46).Top=intRow2Top
Command1(46).Left=4680*lngpcnt
Command1(46).Width=intLetterWidth
Command1(46).Height=intHeight
'= Key
Command1(47).Font.Size=intFontSize
Command1(47).Top=intRow2Top
Command1(47).Left=5100*lngPcnt
Command1(47).Width=intLetterWidth
Command1(47).Height=intHeight
'Backspace Key
cmdBackspace.Font.Size=dblFontSize
cmdBackspace.Top=intRow2Top
cmdBackspace.Left=5520*lngPcnt
cmdBackspace.Width=intRightBorder—cmdBackspace.Left
cmdBackspace.Height=intHeight
'Row 3
'TAB Key
cmdTabFont.Size=dblFontSize
cmdTabTop=intRow3Top
cmdTabLeft=60*lngpcnt
cmdTabWidth=650*lngpcnt
cmdTabHeight=intHeight
'Q Key
Command1(16).Font.Size=intFontSize
Command1(16).Top=intRow3Top
Command1(16).Left=780*lngpcnt
Command1(16).Width=intLetterWidth
Command1(16).Height=intHeight
'W Key
Command1(22).Font.Size=intFontSize
Command1(22).Top=intRow3Top
Command1(22).Left=1200*lngPcnt
Command1(22).Width=intLetterWidth
Command1(22).Height=intHeight
'E Key
Command1(4).Font.Size=intFontSize
Command1(4).Top=intRow3Top
Command1(4).Left=1620*lngpcnt
Command1(4).Width=intLetterWidth
Command1(4).Height=intHeight
'R Key
Command1(17).Font.Size=intFontSize
Command1(17).Top=intRow3Top
Command1(17).Left=2040*lngpcnt
Command1(17).Width=intLetterWidth
Command1(17).Height=intHeight
'T Key
Command1(19).Font.Size=intFontSize
Command1(19).Top=intRow3Top
Command1(19).Left=2460*lngPcnt
Command1(19).Width=intLetterWidth
Command1(19).Height=intHeight
'Y Key
Command1(24).Font.Size=intFontSize
Command1(24).Top=intRow3Top
Command1(24).Left=2880*lngpcnt
Command1(24).Width=intLetterWidth
Command1(24).Height=intHeight
'U Key
Command1(20).Font.Size=intFontSize
Command1(20).Top=intRow3Top
Command1(20).Left=3300*lngPcnt
Command1(20).Width=intLetterWidth
Command1(20).Height=intHeight
'I Key
Command1(8).Font.Size=intFontSize
Command1(8).Top=intRow3Top
Command1(8).Left=3720*lngpcnt
Command1(8).Width=intLetterWidth
Command1(8).Height=intHeight
'O Key
Command1(14).Font.Size=intFontSize
Command1(14).Top=intRow3Top
Command1(14).Left=4140*lngpcnt
Command1(14).Width=intLetterWidth
Command1(14).Height=intHeight
'P Key
Command1(15).Font.Size=intFontSize
Command1(15).Top=intRow3Top
Command1(15).Left=4560*lngPcnt
Command1(15).Width=intLetterWidth
Command1(15).Height=intHeight

```
'[ Key
Command1(41).Font.Size=intFontSize
Command1(41).Top=intRow3Top
Command1(41).Left=4980*lngPcnt
Command1(41).Width=intLetterWidth
Command1(41).Height=intHeight
'] Key
Command1(42).Font.Size=intFontSize
Command1(42).Top=intRow3Top
Command1(42).Left=5400*lngPcnt
Command1(42).Width=intLetterWidth
Command1(42).Height=intHeight
'\ Key
Command1(43).Font.Size=intFontSize
Command1(43).Top=intRow3Top
Command1(43).Left=5820*lngPcnt
Command1(43).Width=intLetterWidth
Command1(43).Height=intHeight
'Delete
cmdDelete.Font.Size=dblFontSize
cmdDelete.Top=intRow3Top
cmdDelete.Left=6240*lngpcnt
cmdDelete.Width=intRightBorder—cmdDelete.Left
cmdDelete.Height=intHeight
'Row 4
'Caps Lock Key
cmdCapsLock.Font.Size=dblFontSize
cmdCapsLock.Top=intRow4Top
cmdCapsLock.Left=60*lngPcnt
cmdCapsLock.Width=1070*lngPcnt
cmdCapsLock.Height=intHeight
'A Key
Command1(0).Font.Size=intFontSize
Command1(0).Top=intRow4Top
Command1(0).Left=1200*lngPcnt
Command1(0).Width=intLetterWidth
Command1(0).Height=intHeight
'S Key
Command1(18).Font.Size=intFontSize
Command1(18).Top=intRow4Top
Command1(18).Left=1620*lngpcnt
Command1(18).Width=intLetterWidth
Command1(18).Height=intHeight
'D Key
Command1(3).Font.Size=intFontSize
Command1(3).Top=intRow4Top
Command1(3).Left=2040*lngpcnt
Command1(3).Width=intLetterWidth
Command1(3).Height=intHeight
'F Key
Command1(5).Font.Size=intFontSize
Command1(5).Top=intRow4Top
Command1(5).Left=2460*lngPcnt
Command1(5).Width=intLetterWidth
Command1(5).Height=intHeight
'G Key
Command1(6).Font.Size=intFontSize
Command1(6).Top=intRow4Top
Command1(6).Left=2880*lngpcnt
Command1(6).Width=intLetterWidth
Command1(6).Height=intHeight
'H Key
Command1(7).Font.Size=intFontSize
Command1(7).Top=intRow4Top
Command1(7).Left=3300*lngpcnt
Command1(7).Width=intLetterWidth
Command1(7).Height=intHeight
'J Key
Command1(9).Font.Size=intFontSize
Command1(9).Top=intRow4Top
Command1(9).Left=3720*lngPcnt
Command1(9).Width=intLetterWidth
Command1(9).Height=intHeight
'K Key
Command1(10).Font.Size=intFontSize
Command1(10).Top=intRow4Top
Command1(10).Left=4140*lngPcnt
Command1(10).Width=intLetterWidth
Command1(10).Height=intHeight
'L Key
Command1(11).Font.Size=intFontSize
Command1(11).Top=intRow4Top
Command1(11).Left=4560*lngPcnt
Command1(11).Width=intLetterWidth
Command1(11).Height=intHeight
'; Key
Command1(39).Font.Size=intFontSize
Command1(39).Top=intRow4Top
Command1(39).Left=4980*lngpcnt
Command1(39).Width=intLetterWidth
Command1(39).Height=intHeight
''' Key
Command1(40).Font.Size=intFontSize
Command1(40).Top=intRow4Top
Command1(40).Left=5400*lngPcnt
Command1(40).Width=intLetterWidth
Command1(40).Height=intHeight
'Enter
cmdEnter.Font.Size dblFontSize
cmdEnter.Top=intRow4Top
cmdEnter.Left=5820*lngpcnt
cmdEnter.Width=intRightBorder—cmdEnter.Left
cmdEnter.Height=intHeight
'Row 5
'Left Shift Key cmdLeftShift.Font.Size=dblFontSize
    cmdLeftShift.Top=intRow5Top cmdLeftShift.Left=
    60*lngPcnt cmdLeftShift.Width=1293*lngPcnt
    cmdLeftShift.Height=intHeight
'Z Key
Command1(25).Font.Size=intFontSize
Command1(25).Top=intRow5Top
Command1(25).Left=1423*lngPcnt
Command1(25).Width=intLetterWidth
```

15

Command1(25).Height=intHeight
'X Key
Command1(23).Font.Size=intFontSize
Command1(23).Top=intRow5Top
Command1(23).Left=1843*lngPcnt
Command1(23).Width=intLetterWidth
Command1(23).Height=intHeight
'C Key
Command1(2).Font.Size=intFontSize
Command1(2).Top=intRow5Top
Command1(2).Left=2263*lngPcnt
Command1(2).Width=intLetterWidth
Command1(2).Height=intHeight
'V Key
Command1(21).Font.Size=intFontSize
Command1(21).Top=intRow5Top
Command1(21).Left=2683*lngPcnt
Command1(21).Width=intLetterWidth
Command1(21).Height=intHeight
'B Key
Command1(1).Font.Size=intFontSize
Command1(1).Top=intRow5Top
Command1(1).Left=3103*lngPcnt
Command1(1).Width=intLetterWidth
Command1(1).Height=intHeight
'N Key
Command1(13).Font.Size=intFontSize
Command1(13).Top=intRow5Top
Command1(13).Left=3523*lngPcnt
Command1(13).Width=intLetterWidth
Command1(13).Height=intHeight
'M Key
Command1(12).Font.Size=intFontSize
Command1(12).Top=intRow5Top
Command1(12).Left=3943*lngPcnt
Command1(12).Width=intLetterWidth
Command1(12).Height=intHeight
', Key
Command1(36).Font.Size=intFontSize
Command1(36).Top=intRow5Top
Command1(36).Left=4363*lngPcnt
Command1(36).Width=intLetterWidth
Command1(36).Height=intHeight
'. Key
Command1(37).Font.Size=intFontSize
Command1(37).Top=intRow5Top
Command1(37).Left=4783*lngPcnt
Command1(37).Width=intLetterWidth
Command1(37).Height=intHeight
'/ Key
Command1(38).Font.Size=intFontSize
Command1(38).Top=intRow5Top
Command1(38).Left=5203*lngPcnt
Command1(38).Width=intLetterWidth
Command1(38).Height=intHeight
'Right Shift Key

16 cmdRightShift.Font.Size=dblFontSize
cmdRightShift.Top=intRow5Top
cmdRightShift.Left=5623*lngpcnt
cmdRightShift.Width=intRightBorder—cmdRightShift.Left
cmdRightShift.Height=intHeight
'Row 6
'Left Ctrl Key
cmdCntrl.Font.Size=dblFontSize
cmdCntrl.Top=intRow6Top
cmdCntrl.Left=60*lngpcnt
cmdCntrl.Width=795*lngpcnt
cmdCntrl.Height=intHeight
'Left Alt Key
cmdAlt.Font.Size=dblFontSize
cmdAlt.Top=intRow6Top
cmdAlt.Left=925*lngpcnt
cmdAlt.Width=735*lngPcnt
cmdAlt.Height=intHeight
'Move Left Key
cmdMoveLeft.Font.Size=intFontSize
cmdMoveLeft.Top=intRow6Top
cmdMoveLeft.Left=1730*lngPcnt
cmdMoveLeft.Width=465*lngpcnt
cmdMoveLeft.Height=intHeight
'Space Bar Key
cmdSpaceBar.Font.Size=intFontSize
cmdSpaceBar.Top=intRow6Top
cmdSpaceBar.Left=2265*lngPcnt
cmdSpaceBar.Width=2445*lngPcnt
cmdSpaceBar.Height=intHeight
'Move Right Key
cmdMoveRight.Font.Size=intFontSize
cmdMoveRight.Top=intRow6Top
cmdMoveRight.Left=4780*lngpcnt
cmdMoveRight.Width=465*lngpcnt
cmdMoveRight.Height=intHeight
'Right Alt Key
cmdAlt2.Font.Size=dblFontSize
cmdAlt2.Top=intRow6Top
cmdAlt2.Left=5315*lngpcnt
cmdAlt2.Width=735*lngpcnt
cmdAlt2.Height=intHeight
'Right Ctrl Key
cmdCntrl2.Font.Size=dblFontSize
cmdCntrl2.Top=intRow6Top
cmdCntrl2.Left=6120*lngPcnt
cmdCntrl2.Width intRightBorder—cmdCntrl2.Left
cmdCntrl2.Height=intHeight
'Exit Keyboard
cmdExitKeyboard.Font.Size=dblFontSize
cmdExitKeyboard.Top=intRow7Top
cmdExitKeyboard.Left=60*lngPcnt
cmdExitKeyboard.Width=6915*lngpcnt
cmdExitKeyboard.Height=intHeight

```
End Sub
Private Sub cmdAlt_Click( )
    If cmdAlt.Tag="OFF" Then
    cmdAlt.Tag="ON"
    cmdAlt.Caption="Alt On"
    cmdAlt2.Tag="ON"
    cmdAlt2.Caption="Alt On"
    Else
    cmdAlt.Tag="OFF"
    cmdAlt.Caption="Alt Off"
    cmdAlt2.Tag="OFF"
    cmdAlt2.Caption="Alt Off"
    End If
End Sub
Private Sub cmdAlt2_Click( )
    cmdAlt_Click
End Sub
Private Sub cmdBackspace_Click( )
    strKeys="{BKSP}"
    SendVKeys (strKeys)
End Sub
Private Sub cmdCntrl_Click( )
    If cmdCntrl.Tag="OFF" Then
    cmdCntrl.Tag="ON"
    cmdCntrl.Caption="Ctrl On"
    cmdCntrl2.Tag="ON"
    cmdCntrl2.Caption="Ctrl On"
    Else
    cmdCntrl.Tag="OFF"
    cmdCntrl.Caption="Ctrl Off"
    cmdCntrl2.Tag="OFF"
    cmdCntrl2.Caption="Ctrl Off"
    End If
End Sub
Private Sub cmdCntrl2_Click( )
    cmdCntrl_Click
End Sub
Private Sub cmdDelete_Click( )
    strKeys=" "
    strKeys=strKeys & "{DEL}"
    SendVKeys (strKeys)
End Sub
Private SubcmdEnter_Click( )
    strKeys=""
    strKeys=strKeys & "{ENTER}"
    SendVKeys (strKeys)
End Sub
Private SubcmdEscape_Click( )
    strKeys="{ESC}"
    SendVKeys (strKeys)
End Sub
Private SubcmdExitKeyboard_Click( )
    End
End Sub
Private Sub cmdLeftShift_Click( )
    If cmdLeftShift.Tag="OFF" Then
    If cmdCapsLock.Tag="OFF" Then
        Shift_Up
    Else
        Set_Caps_Lock
        Shift_Up
    End If
    Else
        Shift_Down
    End If
End Sub
Private Sub cmdMoveLeft_Click( )
    strKeys=" "
    strKeys=strKeys & "{LEFT}"
    SendVKeys (strKeys)
End Sub
Private Sub cmdMoveRight_Click( )
    strKeys=""
    strKeys=strKeys & "{RIGHT}"
    SendVKeys (strKeys)
End Sub
Private Sub cmdRightShift_Click( )
    cmdLeftShift_Click
End Sub
Private Sub cmdSpaceBar_Click( )
    strKeys=""
    strKeys=strKeys & " "
    SendVKeys (strKeys)
End Sub
Private Sub cmdTab_Click( )
    strKeys=""
    If cmdLeftShift.Tag="ON" Then
    strKeys=strKeys & "+"
    End If
    strKeys=strKeys & "{TAB}"
    SendVKeys (strKeys)
End Sub
Private Sub Form_Activate( )
    Dim dl&
    ' KeyboardWindow=GetForegroundWindow dl&=
SetWindowPos(hwnd, -1, 4905, 7965, 6975, 2475, &H1 Or
&H2)
End Sub
Private Sub Form_GotFocuso
If Me.WindowState <>0 Then
    Me.WindowState=0
    ' Me.Width=7000
End If
End Sub
Private Sub Form_Resize( )
If Me.WindowState <>0 Then
    Me.WindowState=0
    Me.Width=7000
End If
Key_Layout1
End Sub
Private Sub cmdCapsLock_Click( )
    ' Caps Lock Key
    If cmdCapsLock.Tag="OFF" Then
        cmdCapsLock.Caption="Caps On"
        cmdCapsLock.Tag="ON"
        Caps_On
    Else
        cmdCapsLock.Caption="Caps Off"
cmdCapsLock.Tag="OFF"
        Caps_OFF
    End If
    strkeys=""
    strkeys=strkeys & "{CAPSLOCKII"
    SendVKeys (strKeys)
End Sub
Private Sub Command1_Click(Index As Integer)
    strKeys=""
    If cmdCapsLock.Tag="ON" Then
    strKeys=strKeys & "{CAPSLOCK}"
```

```
    End If
    If cmdLeftShift.Tag="ON" Then
    strKeys=strKeys & "+"
    End If
    If cmdAlt.Tag="ON" Then
    strKeys=strKeys & "%"
    End If
    If cmdCntrl.Tag="ON" Then
    strKeys=strKeys & "^"
    End If
    strKeys=strKeys & Command1(Index).Tag
    SendVKeys (strKeys)
End Sub
Private Sub Form_Load( )
Dim hSysMenu As Long
Dim nCnt As Long
' First, show the form
Me.Show
' Get handle to our form's system menu
' (Restore, Maximize, Move, close etc.)
SysMenu=GetSystemMenu(Me.hwnd, False)
If hSysMenu Then
'=0 Get System menu's menu count
nCnt=GetMenuItemCount(hSysMenu)
If nCnt Then
'Menu count is based on 0 (0, 1, 2, 3 . . . )
RemoveMenu hSysMenu, nCnt-1, _
MF_BYPOSITION Or MF_REMOVE
RemoveMenu hSysMenu, nCnt-2, _
MF_BYPOSITION Or MF_REMOVE ' Remove the seperator
DrawMenuBar Me.hwnd
' Force caption bar's refresh. Disabling X button
Me.Caption="GeniSus Keyboard"
End If
End If
    Shift_Down
    Hook
#If CurrentProcOnly=1 Then
    Form1.Show
#End If
DeactivateClose
End Sub
Private Sub Form_Unload(Cancel As Integer)
    UnHook
End Sub
Public Sub DeactivateClose( )
    End Sub
    An example of an accompanying dynamic link library, .dll application, through which external applications may access the keyboard application is:
// vKeyHook.cpp : Defines the entry point for the DLL application.
//
#include <windows.h>
#include <winuser.h>
#pragma data_seg(".SHARDATA")
    static int hWndActive=0;
    static int hWndSelf=0;
    static HHOOK hHook=0;
#pragma data_seg( )
BOOL APIENTRY DllMain( HANDLE hModule,
        DWORD ul_reason_for_call,
        LPVOID lpReserved
            )
{
    switch (ul_reason_for_call)
    {
    case DLL_PROCESS_ATTACH:
    case DLL_THREAD_ATTACH:
    case DLL_THREAD_DETACH:
    case DLL_PROCESS_DETACH: break;
    }
    return TRUE;
}
long CALLBACK CBTProc(
    int nCode, // hook code
    WPARAM wparam, // current-process flag
    LPARAM lParam // message data
)
{
    if (nCode==HCBT_ACTIVATE &&
        (int)wParam !=hWndSelf){
        hWndActive=(int)wParam;
    }
    return CallNextHookEx(hHook, nCode, wParam, lparam);
}
void_stdcall HookMsg(int hwnd)
}
    HINSTANCE hModule;
    hModule=GetModuleHandle("vKeyHook.dll");
    hHook=SetWindowsHookEx(WH_CBT, CBTProc, hModule, 0);
    hWndSelf=hwnd;
}
void_stdcall UnHookMsg( )
{
    UnhookWindowsHookEx(hHook);
}
int_stdcall GetActiveWnd( )
{
    return hWndActive;
```

These codes are preferably executed in conjunction with a Windows 98® operating system. These codes may be executed in any type of system, including, but not limited to, a web based system, a computer network, or any personal computer, personal digital assistant or other device.

As can clearly be seen in FIGS. 1 and 2, there are no minimizing, maximizing, or close options available for the user. Therefore, a user can input data by selecting keys 22 on the keyboard 20 as necessary.

A general description of the present invention as well as a preferred embodiment of the present invention has been set forth above. Those skilled in the art to which the present invention pertains will recognize and be able to practice additional variations in the methods and systems described which fall within the teachings of this invention. Accordingly, all such modifications and additions are deemed to be within the scope of the invention which is to be limited only by the claims appended hereto.

What is claimed is:

1. A method of entering data on a touch screen display, the method comprising:

invoking a computer program in which user input is sought;

invoking an input area, including a plurality of data input fields;

invoking a graphical keyboard area incapable of user termination independent of termination of the input area, the graphical keyboard area having a plurality of keys on the display;

selecting keys on the keyboard to provide the desired input; and automatically terminating the graphical keyboard area after the desired input is received in the input area.

2. The method of entering data on a touch screen display of claim 1 wherein the input area is created by an executable code.

3. The method of entering data on a touch screen display of claim 2 wherein the executable code is compiled visual basic code.

4. The method of entering data on a touch screen display of claim 1 wherein the computer program invokes the input area.

5. The method of entering data on a touch screen display of claim 4 wherein the computer program accesses a dynamic link library file in order to invoke the input area.

6. The method of entering data on a touch screen display of claim 5 wherein the dynamic link library file is a C++ program.

7. The method of entering data on a touch screen display of claim 1 wherein the computer program is executing on a personal computer.

8. The method of entering data on a touch screen display of claim 1 wherein the computer program is executing on a pen-based computer.

9. The method of entering data on a touch screen display of claim 1 wherein the computer program is executing on a computer with a touch-screen display.

10. A method of providing a user interface for receiving information from a user using a user immutable graphical keyboard linked to an input area, comprising:

invoking the input area;

determining that input from the user using the graphical keyboard is needed within the input area;

invoking the graphical keyboard on a touch screen display to receive input from a user, the graphical keyboard placed in a set position;

persistently maintaining the graphical keyboard on the touch screen display such that the user cannot move, resize, remove, or close the graphical keyboard through the user interface while the input area remains and requires input;

receiving input within the input area from the user through the graphical keyboard;

determining that further input from the user is no longer needed in the input area; and removing the graphical keyboard.

* * * * *